(12) United States Patent
Kim et al.

(10) Patent No.: US 7,414,594 B2
(45) Date of Patent: Aug. 19, 2008

(54) MULTI DISPLAY DEVICE

(75) Inventors: Si Han Kim, Kyunggi-Do (KR); Hyung Nyun Kim, Seoul (KR); Mi Sun Cha, Kyunggi-Do (KR)

(73) Assignee: Si Han Kim, Daessangyong-Ri, Choweol-Myun, Kwangju-Kun, Kyunggi-Do (KR)

( * ) Notice: Subject to any disclaimer, the term of this patent is extended or adjusted under 35 U.S.C. 154(b) by 273 days.

(21) Appl. No.: 11/423,804

(22) Filed: Jun. 13, 2006

(65) Prior Publication Data

US 2006/0238440 A1 Oct. 26, 2006

Related U.S. Application Data

(63) Continuation of application No. 10/363,343, filed as application No. PCT/KR01/01557 on Sep. 18, 2001, now abandoned.

(30) Foreign Application Priority Data

Sep. 19, 2000 (KR) ............... 2000-54898
Jan. 12, 2001 (KR) ............... 2001-1790
Sep. 29, 2001 (KR) ............... 2001-52509

(51) Int. Cl.
G09G 5/00 (2006.01)

(52) U.S. Cl. .......... 345/1.3; 345/1.1; 345/903; 359/450; 349/73

(58) Field of Classification Search .......... 345/1.1, 345/1.3, 87, 903; 359/450; 349/73
See application file for complete search history.

(56) References Cited

U.S. PATENT DOCUMENTS

| | | | | | |
|---|---|---|---|---|---|
| 5,467,102 | A | * | 11/1995 | Kuno et al. | 345/1.3 |
| 5,734,513 | A | * | 3/1998 | Wang et al. | 359/742 |
| 5,828,410 | A | * | 10/1998 | Drapeau | 348/383 |
| 5,903,328 | A | * | 5/1999 | Greene et al. | 349/73 |
| 6,072,476 | A | * | 6/2000 | Harada et al. | 345/204 |
| 6,177,912 | B1 | * | 1/2001 | Izumi | 345/1.3 |
| 6,483,482 | B1 | * | 11/2002 | Kim | 345/3.1 |
| 6,486,890 | B1 | * | 11/2002 | Harada et al. | 345/660 |
| 6,512,497 | B1 | * | 1/2003 | Kondo et al. | 345/1.1 |
| 6,628,244 | B1 | * | 9/2003 | Hirosawa et al. | 345/2.3 |

* cited by examiner

*Primary Examiner*—Richard Hjerpe
*Assistant Examiner*—Kimnhung Nguyen (57) ABSTRACT

The present invention is directed to a multi display device that can realize a large-sized screen by interconnecting a plurality of display elements. The multi display device comprises at least two flat display elements of which adjacent sides are closely contact each other to make a large-sized screen, housings receiving and supporting the display elements, respectively, light-compensating means for refracting display light from the display elements toward a center area of the adjacent sides thereof, thereby to minimize or remove the non-display area in the screen.

24 Claims, 13 Drawing Sheets

MULTI DISPLAY DEVICE

This application is a continuation of U.S. Ser. No. 10/363,343 filed Mar. 3, 2003 now abandoned which is a national stage of PCT/KR01/01557 filed Sep. 18, 2001.

TECHNICAL FIELD

The present invention relates to a multi display device that can realize the large-sized screen by connecting plural display elements, and more particularly to a display device that can improve the display quality by minimizing or eliminating the non-display area formed on the border between the adjacent display elements.

BACKGROUND ART

In recent years, as the mobile information system has been developed, it has been possible for a user to connect to the network and to computing-work using a mobile computer, a digital mobile communication system and other periphery devices regardless of where he/she is.

Accordingly, the use of the mobile information systems is gradually increased. Therefore, it is required to reduce the size, weight, thickness of a variety of information systems such as mobile phones, e-books, mobile computers and personal digital assistant devices system considering the mobility of the systems.

However, as the size of the mobile information system is reduced, although the mobility and portability of the system are improved, the screen size for displaying the information is reduced.

Accordingly, a display device that is designed to display a large amount of information by making the utmost use of the reduced screen size while satisfying the mobility and portability has been developed.

As an example, a multi display device having plural display elements connected to be adjacent to each other to realize the large sized screen for displaying a large amount of information.

As the display elements used in the multi display device, a liquid crystal display (LCD), a thin film transistor (TFT)-LCD, a field emission display (FED), a plasma display panel (PDP), and an electro luminescent (EL) are usually used.

However, the adjacent sidewalls of the display elements of the prior art are not exactly arranged on an identical line and the periphery surfaces in the vicinity of the adjacent sidewalls are enclosed by a housing (or a case), defining the non-display areas. The non-display areas in the vicinity of the adjacent sidewalls make the screens of the display elements seen to be divided, deteriorating the display quality of the display device.

DISCLOSURE OF INVENTION

The present invention has been made in an effort to solve the above described problems.

It is an objective of the present invention to provide a multi display device that can improve the display quality by minimizing a non-display area by optically compensating and deflecting the display light to the border between the adjacent is sidewalls of the display elements.

To achieve the above objectives, the present invention provide a multi display device comprising first and second flat display elements respectively having first and second adjacent sidewalls to realize an enlarged screen; first and second panel housings for receiving and supporting the first and second flat display elements, respectively; and optical compensating means for refracting display lights emitted from the flat display elements to a border between the first and second adjacent sidewalls, thereby minimizing or eliminating a non-display area.

Wherein the display lights from the first and second flat display elements meet at an extending line of a center of the border.

Preferably, a diffuser is disposed on a location where the display lights of the flat display elements meet. In addition, a light guiding plate may be disposed between the diffuser and the optical compensating means. Alternatively, a space or the light guiding plate is defined or disposed between the optical compensating means and the location where the display lights meet.

Preferably, when a distance from the point where the display lights are initially refracted to the point where the display lights meet each other is B the B becomes A/tanθ, wherein A is a length from the center of the board to the non-display area of one of the flat display elements, the length A is about 0.1-3 mm and a refraction angle θ is in a range of about 5-85°.

The optical compensating means comprises a light transmittable/refractable member having an inclined surface at a predetermined angle with respect to a screen of the first and second flat display elements.

When the flat display elements are formed of an LCD, a path of the display lights compensated by the optical compensating means is coincided with a polarizing shaft of a polarizing plate.

The optical compensating means is symmetrically formed on the first and second flat display elements, and designed to cover a screen of the first and second flat display elements and the first and second adjacent sidewalls.

The multi display device may further comprise a transparent protecting member for covering the screen and the first and second sidewalls.

The first and second panel housings are respectively provided with openings such that the first and second adjacent sidewalls can contact each other.

Each of the panel housings comprises a housing body for receiving the corresponding flat display elements, a supporting part for supporting the flat display elements, and a top cover for covering a periphery non-display area.

The multi display device may further comprises a folding support means for supporting the panel housings such that the panel housings can be folded and unfolded at an angle of 180°. The folding support means comprises a hinge assembly installed on a rotational center of the panel housings.

The first and second flat display elements are assembled with a driving circuit board and a back light by chassis, and the chassis comprises a fixing member for preventing the panel assembly from removing and moving and a supporting member for maintaining the panel assembly at a predetermined height.

The multi display device may further comprises input means such as a touch panel formed on the flat display elements and a keyboard.

The optical compensating means is symmetrical on the basis of a board between the first and second adjacent sidewalls, and formed of a single film.

The optical compensating means comprises fixing members inserted into coupling grooves formed on the panel housings. An elastic member is disposed between the fixing member and the panel housings.

The panel housings are provided with a sliding groove along which the fixing member of the optical compensating member moves sliding.

The optical compensating means comprises ribs that are inserted into minute grooves formed on the panel housings. The minute grooves on the board are wider than other portion.

The panel housings are provided with a receiving part for receiving the optical compensating means.

The multi display device may further comprises transmission means for transmitting the movement of the panel housings when the panel housings are being folded or unfolded. The movement of the hinge assembly connected to the panel housings is transmitted to the optical compensating means by the transmission means. The hinge assembly is formed of a gear.

The multi display device may further comprises cover means for covering the adjacent sidewalls and the optical compensating means.

BEST MODE FOR CARRYING OUT THE INVENTION

Preferred embodiments of the present invention will be described more in detail hereinafter.

First Embodiment

Figure 1:
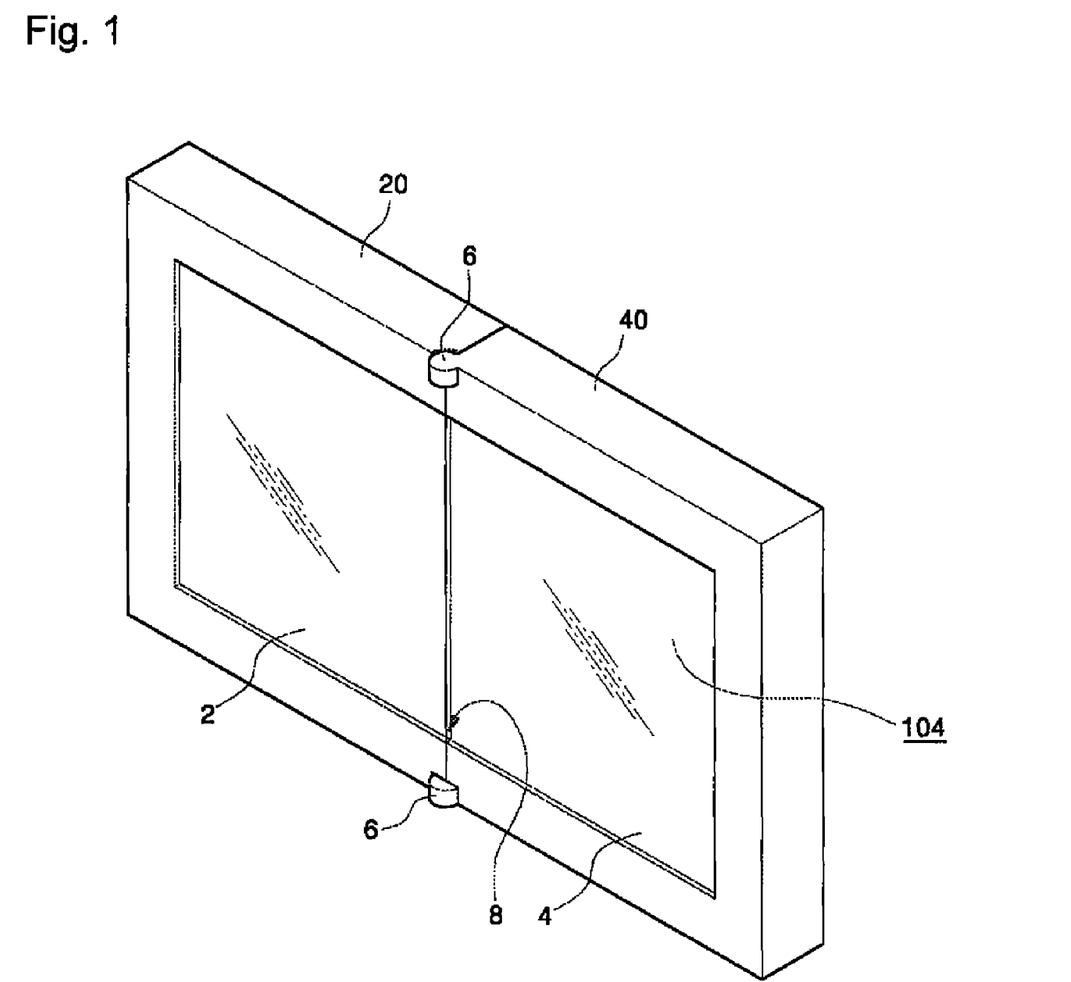
FIGS. 1 and 2 are perspective views illustrating a multi display device according to a first embodiment of the present invention.
Figure 2:
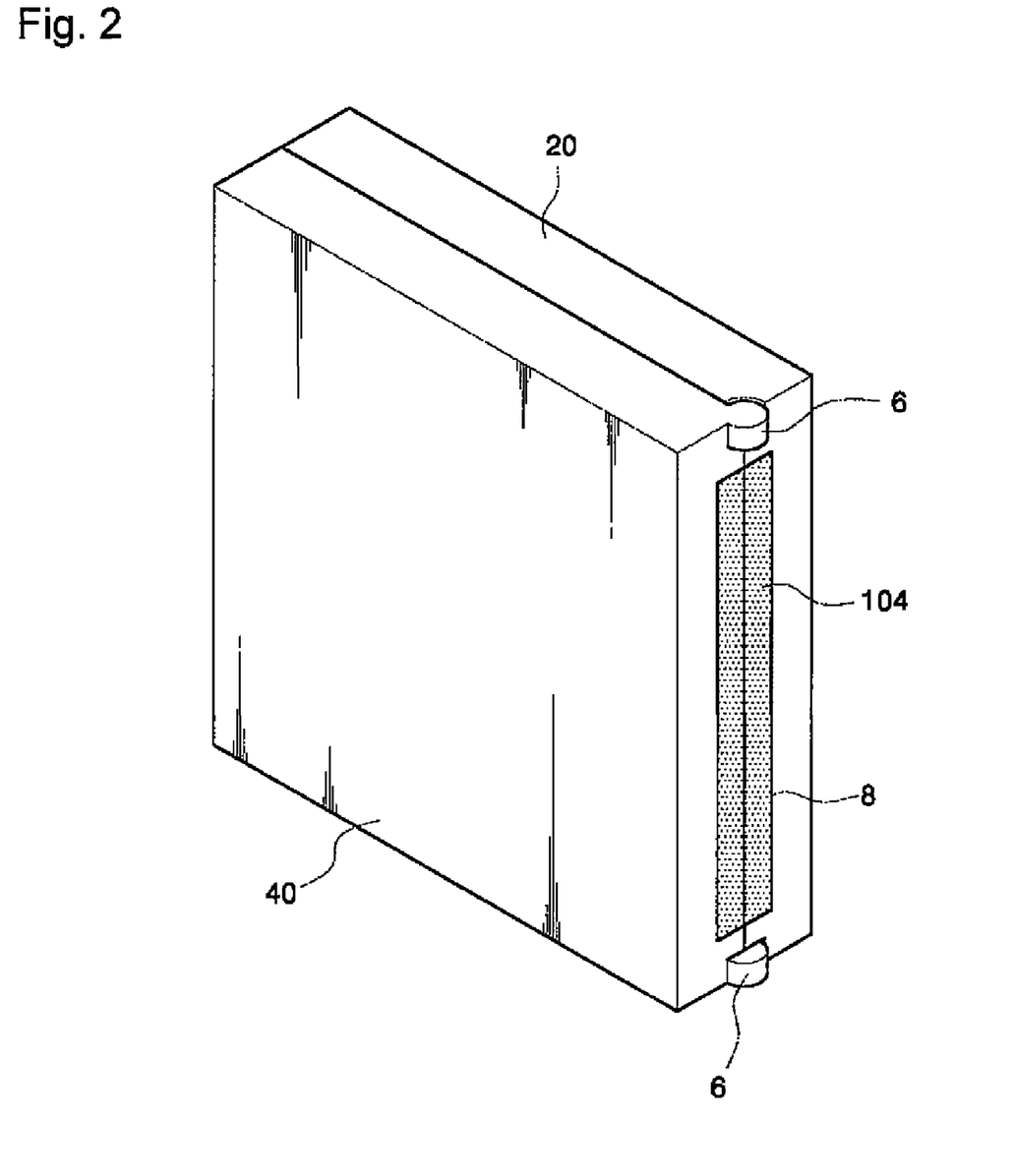
Figure 3:
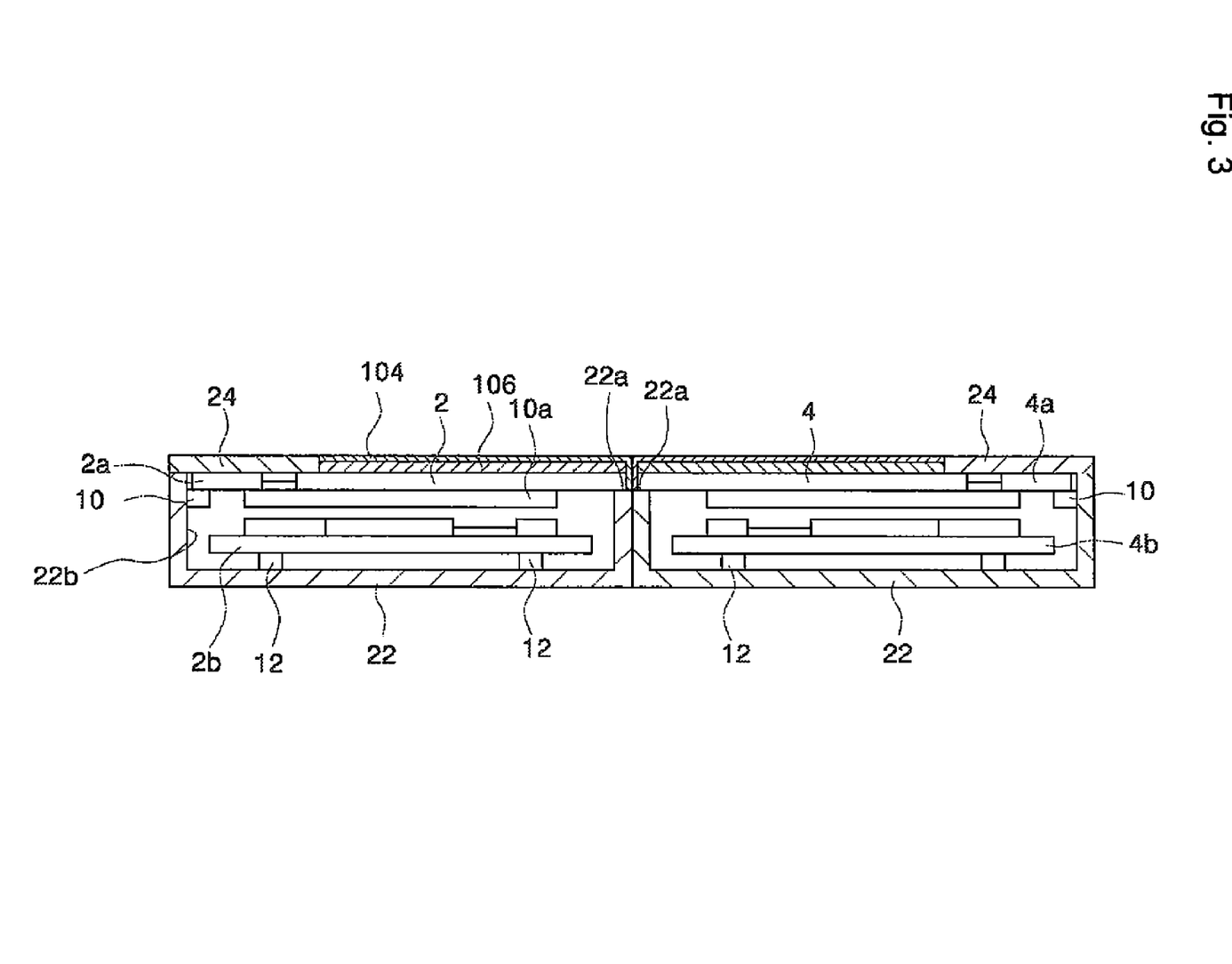
FIG. 3 is a sectional view of a multi display device employed to a first embodiment of the present invention.

FIGS. 1 to 3 show a multi display device according to a first embodiment of the present invention, in which the device is shown in a variety of states, i.e., folded and unfolded states are shown.

As shown in the drawings, the inventive multi display device includes a pair of panel housings 20 and 40 for respectively receiving a pair of flat display elements 2 and 4 and folding support means 6 for coupling the panel housings 20 and 40 such that the panel housings 20 and 40 can be folded on a same plane or at least 180°.

The folding support means 6 is formed on a hinge assembly mounted on a common pivot center of the panel housings 20 and 40.

The flat display elements 2 and 4 are selected from the group consisting of an LCD, an FED, a PDP, and an EL including an organic EL.

The flat display elements 2 and 4 are received in the panel housings 20 and 40 such that at least one side ends thereof contact each other. That is, the panel housings 20 and 40 are provided at their adjacent walls with openings 8. The side ends of the flat display elements 2 and 4 are exposed through the openings 8 when the panel housings are folded.

Describing more in detail, each of the panel housings 20 and 40 includes a housing body 22 designed in a box-shape to receive the respective one of the flat display elements 2 and 4.

The top of the housing body 22 is opened and provided with a opening supporter 22a defined by cut a side wall of the adjacent walls so as to support one side of the flat display element and allow the side ends of the flat display elements contact each other. Accordingly, one side of the flat display elements 2 and 4 is exposed through the opening 8 in a state where it is supported by the opening support 22a. In addition, the housing body 22 is provided at its inside with a supporting member 10 for supporting and maintaining the flat display elements 2 and 4 at a predetermined height. The supporting part 10 may be formed by attaching a projection on a sidewall 22b distal from the adjacent wall.

As is well known, the flat display elements 2 and 4 include driving ICs 2a and 4a or a driving circuit board and backlights 2b and 4b. In addition, a main circuit board may be disposed under the flat display elements 2 and 4. To support the board and light 2b and 4b, the housing body 22 is provided with an additional supporting member 12.

Figure 4:
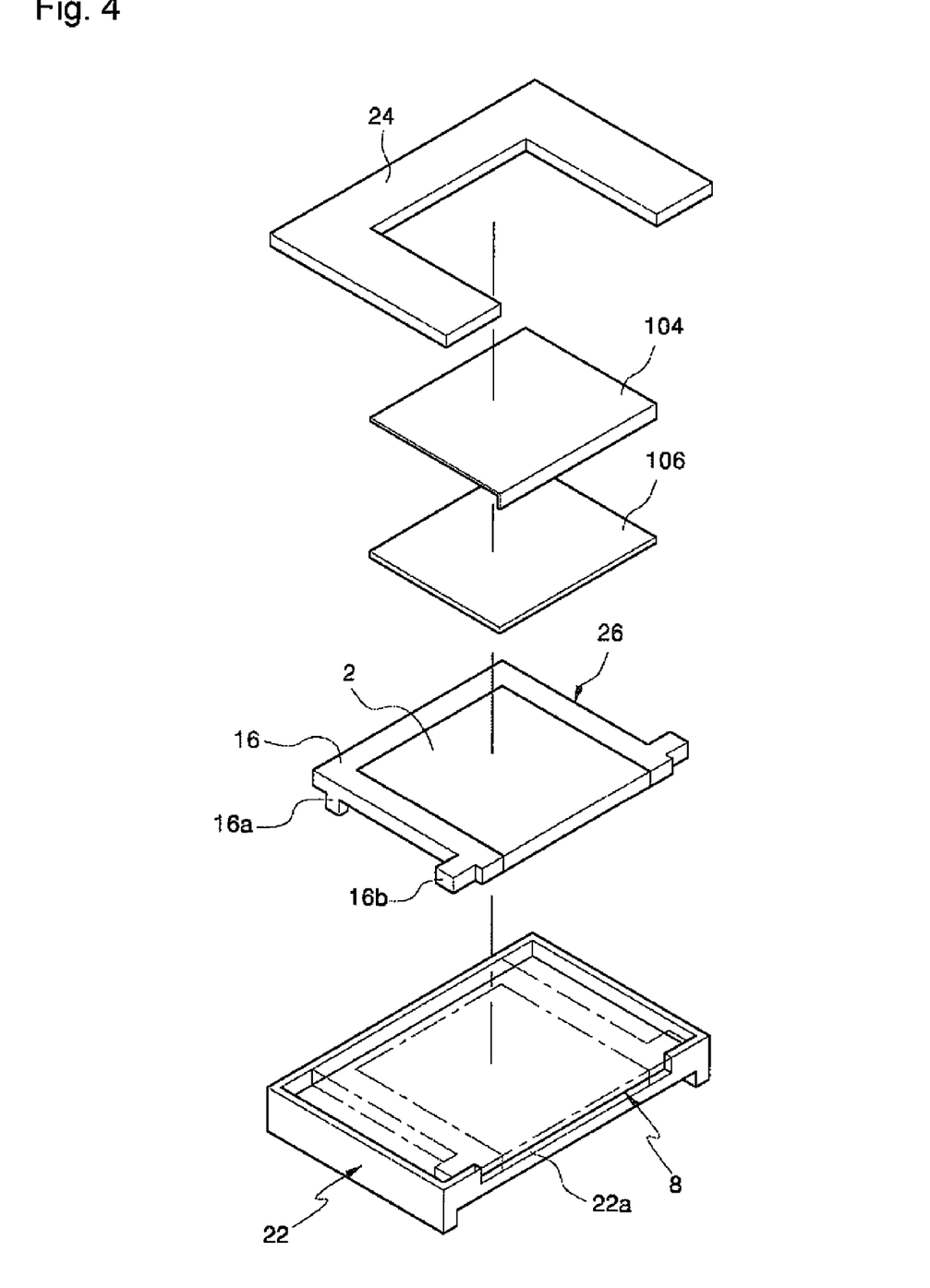
FIG. 4 is an exploded perspective view of a panel housing employed to a first embodiment of the present invention.

FIG. 4 shows another example of flat display elements of the present invention. In this example, the flat display elements 2 and 4 are assembled with a driving IC or a driving circuit board and a back light and supported by a chassis 16, thereby forming a panel assembly 26.

The panel assembly 26 are received in the panel housings 20 and 40 and supported by the opening support 22a. In this embodiment, a supporting member 16a extending downward from the chassis is formed 16 instead of the supporting part 10.

The chassis 16 has a fixing member 16b for preventing the panel assembly 26 from being removed from or moved in the housing body 22 when the case is folded or unfolded. As shown in the drawings, the fixing member 16b is projected from the chassis 16 in the form of wings or projected downward from the chassis 16.

A cover 24 is installed to cover the top of the flat display elements 2 and 4. The cover 24 covers the non-display areas of the flat display elements 2 and 4 that is supported on the opening support 22a or the supporting part 10. In addition, the cover 24 is provided at its contacting side end with an opening so that the flat display elements 2 and 4 can contact each other at their adjacent side ends when the flat display elements 2 and 4 are unfolded.

In addition, as a feature of the present invention, optical compensating means 14 for minimizing or removing the non-display area in the vicinity of the border between the flat display elements 2 and 4 are provided.

Figure 5:
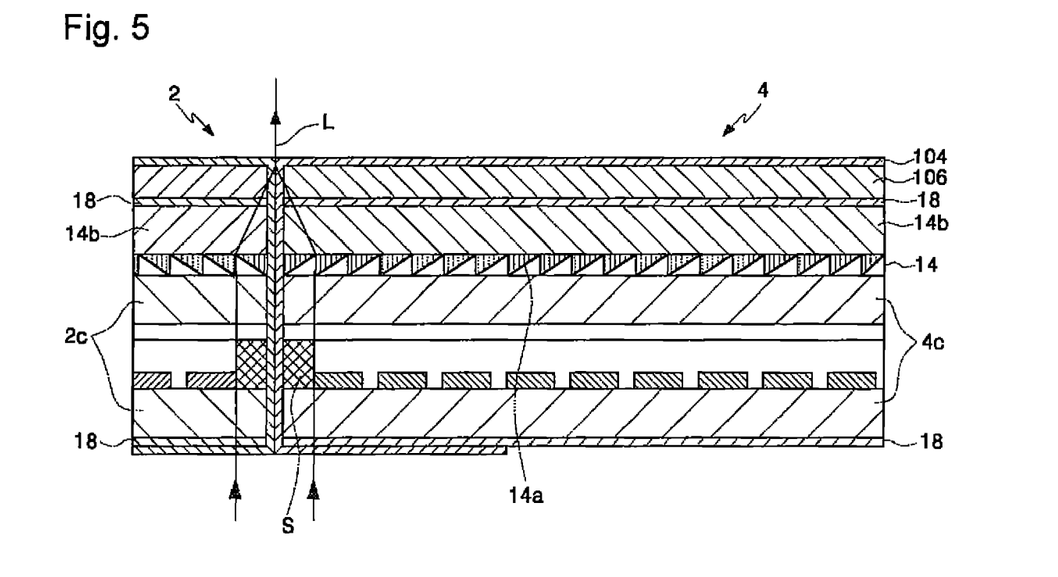
FIG. 5 is an enlarged sectional view of flat display elements employed to a first embodiment of the present invention.

As shown in FIG. 5, the optical compensating means 14 is designed to refract and collect the display light L projected frontward at the border between the adjacent side ends of the flat display elements 2 and 4, thereby minimizing the non-display area.

Describing more in detail, the optical compensating means 14 is designed using a principal in which the light is refracted at the board between different mediums. Therefore, the optical compensating means 14 is formed of a light transmission-refracting member such as resin and plastic. The optical compensating means 14 is provided with plural inclined surfaces 14a each having a predetermined angle with respect to the surfaces of the flat display elements so as to maintain a predetermined refracting angle of the display light.

Here, when the LCD is used as the flat display elements 2 and 4, ITO electrodes and orientation layers are formed on inner surfaces of a pair of the substrates 2c and 4c, and liquid crystal material is injected in a space between the substrates sealed by the sealant. Polarizing plates 18 are attached on the flat display elements 2 and 4, preferably on an outer side of the optical compensating means 14. In addition, when the EL display is used as the flat display elements 2 and 4, an organic light emission layer is formed between the substrates 2c and 4c.

Figure 6:
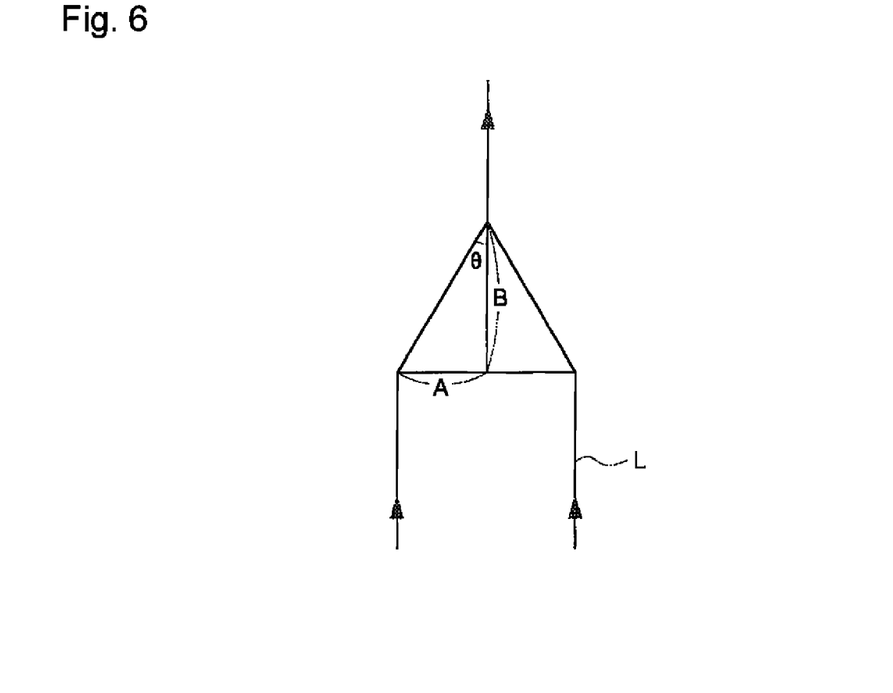
FIG. 6 is a view illustrating an operation state of optical compensating means employed to a first embodiment of the present invention.

The light refraction of the present invention will be described with reference to FIG. 6.

The display light L emitted toward the flat display elements 2 and 4 meets the optical compensating means 14 that is the different media and is symmetrically refracted to induce toward the border. Then, the light is converged at a location spaced away from the surface of the substrates at a predetermined distance. At this point, since the user views a point after the display light L is converged, the non-display area formed by the sealant can be minimized or eliminated.

In addition, the location L where the display lights from the both flat display elements 2 and 4 is converged can be variably designed according to the intension of the designer. That is, when the distance from the point where the display lights are initially refracted to the point where the display lights meet each other is B, the B becomes A/tanθ. At this point, the A is a length from the center of the board to the non-display area of one of the flat display element. The length A is about 0.1-3 mm. In addition, the refraction angle θ is in a range of about 5-85°.

A light guiding plate 14b may be disposed between the optical compensating means 14 and the point where the display lights meet each other or a space is defined between the optical compensating means 14 and the point where the display lights meet.

Figure 7:
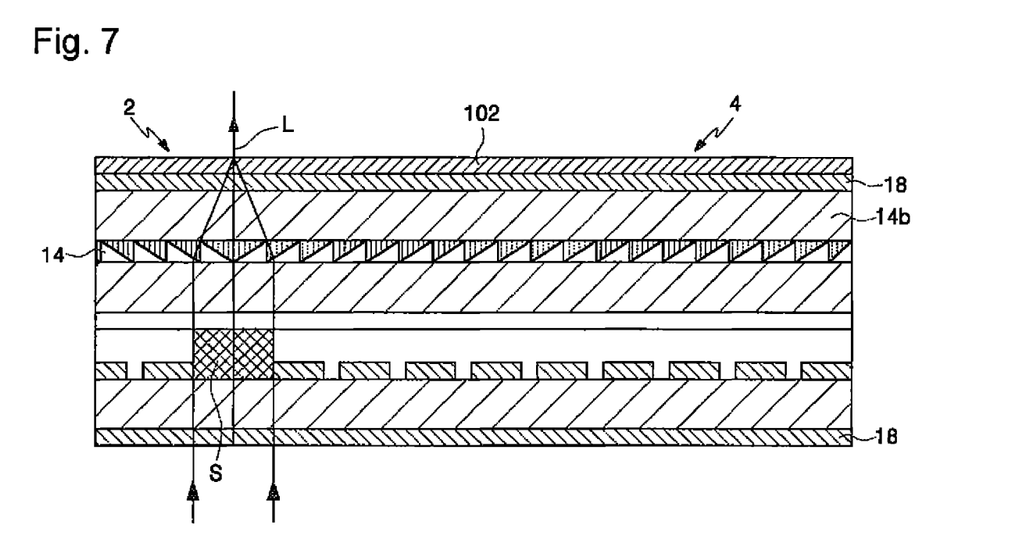
FIG. 7 is a sectional view of flat display elements according to another example of the present invention.

As another example, as shown in FIG. 7, a diffuser may be disposed on the point where the display lights L that are refracted by the optical compensating means 14 meet each other. The diffuser 102 makes the display lights L that are projected at a predetermined angle to be projected frontward in parallel, improving the display quality.

Figure 8:
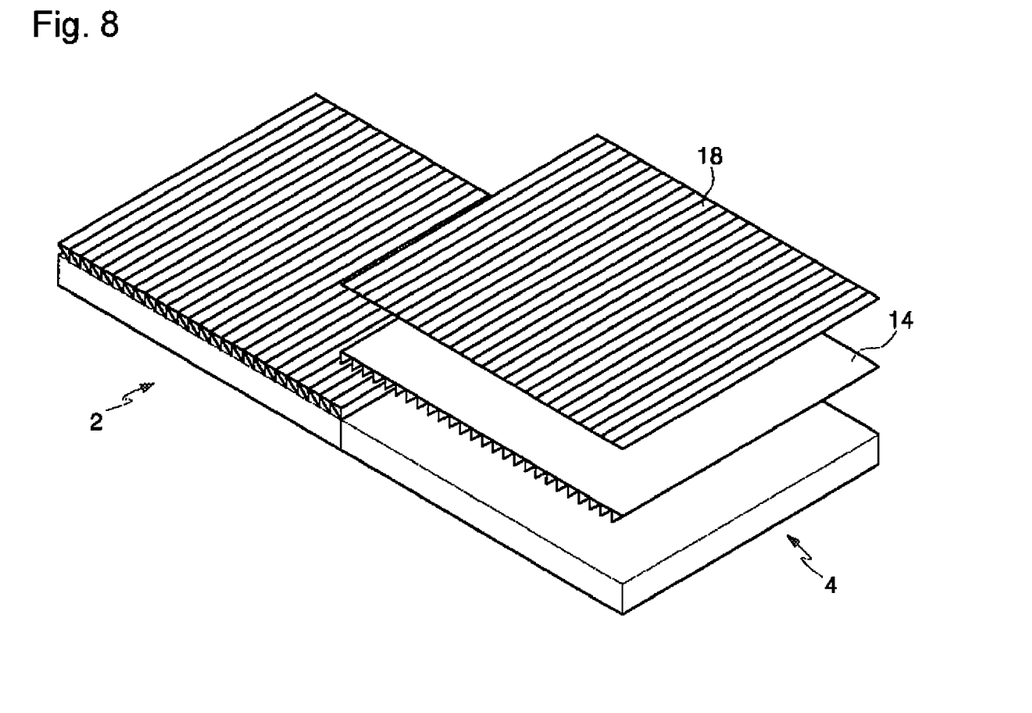
FIG. 8 is a perspective view of a polarizing plate according to another example of the present invention.

When the flat display elements are made of the LCD, it is preferable that the diffuser is attached on the outer surface of the polarizing plate 18. The polarizing plate 18 disposed on a side where the display light L is emitted should be adjusted in its polarizing axis. That is, as shown in FIG. 8, when the shifting direction of the display lights refracted by the optical compensating means 14 is coincided with the polarizing axis, the display quality may be improved by maximizing the transmission rate of the display lights L by adjusting the polarizing axis.

In the present invention, a transparent protector 104 may be further disposed on the flat display elements 2 and 4 to protect the screen and the opening of the border. The transparent protector 104 is a film formed of transparent plastic such as polycarbonate, polyacrylate and polyethylene terephthalate (PET). The transparent protector 104 is bent in "⌐"-shape to cover the screen and the sidewall of the border. Particularly, when the panel housing 20 is folded, the protector 104 covers the sidewalls of the flat display elements 2 and 4 that are exposed through the opening 8 so as to prevent any alien substance from being infiltrated.

When input means is disposed on the flat display elements 2 and 4, the transparent protector 104 is attached on the flat display elements 2 and 4 by using adhesives to cover the surface and the sidewall of input means that will be described hereinbelow. In addition, the transparent protector 104 may be formed in '⊏'-shape to enhance the adhesive property of the transparent protector.

Alternatively, instead of the film, the protector 104 may be formed of the optical compensating means 14 of the present invention. At this point, the optical compensating means 14 is disposed to cover the screen and sidewalls of the flat display elements 2 and 4.

As input means, a touch panel 106 or a keyboard (not shown) may be used as input means of the present invention. The touch panel 106 is disposed on the flat display elements 2 and 4. At this point, the protector 104 and/or the optical compensating means 14 may be disposed on the touch panel 106.

When using the touch panel 106, a data information processor such as a microcomputer is installed in the panel housings 20 and 40. The data information processor, the driving ICs 2a and 4a and the touch panel 106 are connected to each other by an interface. When using the keyboard as the input means, an outer interface may be used to connect the keyboard to the driving ICs 2 and 4a.

Second Embodiment

In this embodiment, the optical compensating means is a single member formed on the flat display elements 2 and 4.

Figure 9:
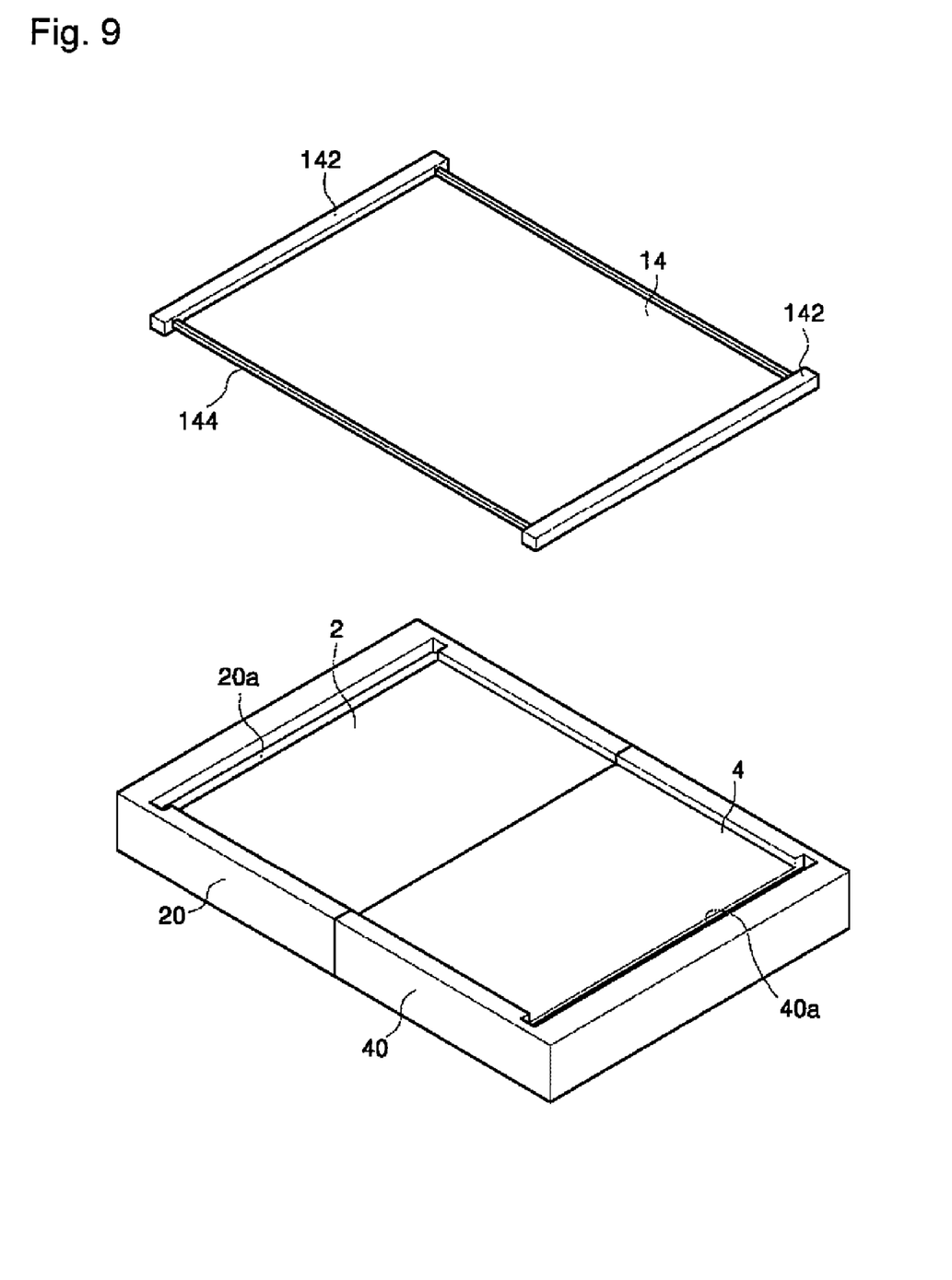
FIGS. 9 to 11 are perspective views illustrating a multi display device according to a second embodiment of the present invention.

As shown in FIG. 9, optical compensating means 14 is a single film formed on the flat display elements 2 and 4 received in the panel housings 20 and 40. At this point, the panel housing housings 20 and 40 and the optical compensating means 14 are provided with coupling means for coupling thereof.

The coupling means comprises coupling grooves 20a and 40a formed on the panel housings 20 and 40 and a fixing frame 142 formed on the optical compensating means 14 and coupled with the coupling grooves 20a and 40a. The optical compensating means 14 is provided with ribs 144 so as to enhance the physical reliability of the optical compensating means 14.

The panel housings 20 and 40 are detachably attached to each other and foldable on each other.

Figure 10:
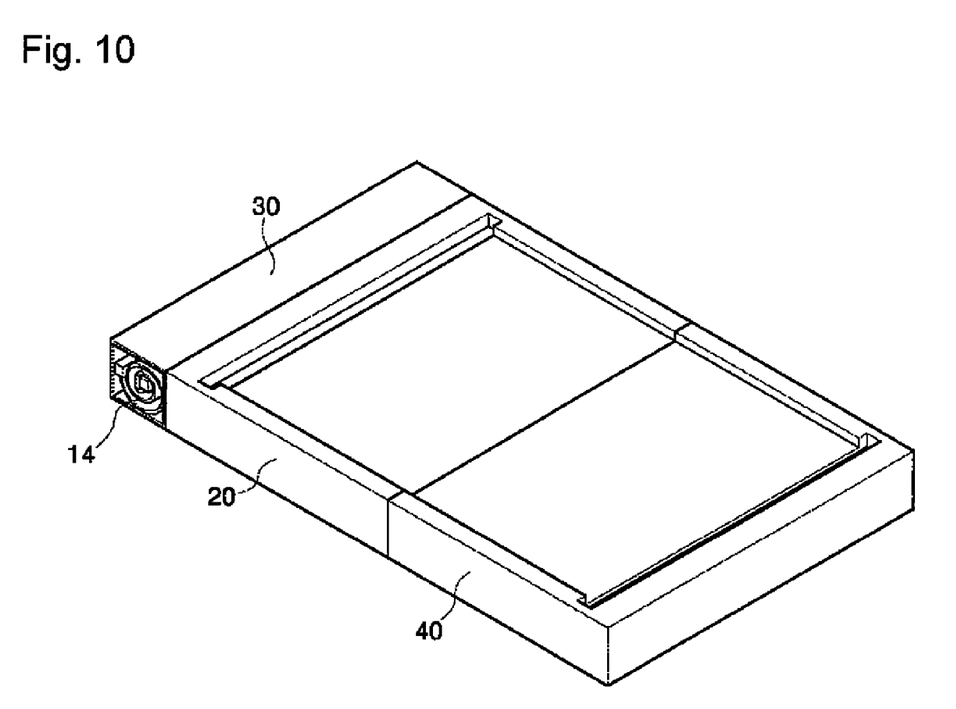

FIG. 10 shows a structure for receiving the optical compensating means 14. The panel housings 20 and 40 are separated from each other, and the optical compensating means 14 is separately received in the panel housings 20 and 40. That is, a receiving part 30 is formed on a side of the panel housings 20 and 40, and the light compensating means 14 is rolled in the receiving part 30.

Figure 11:
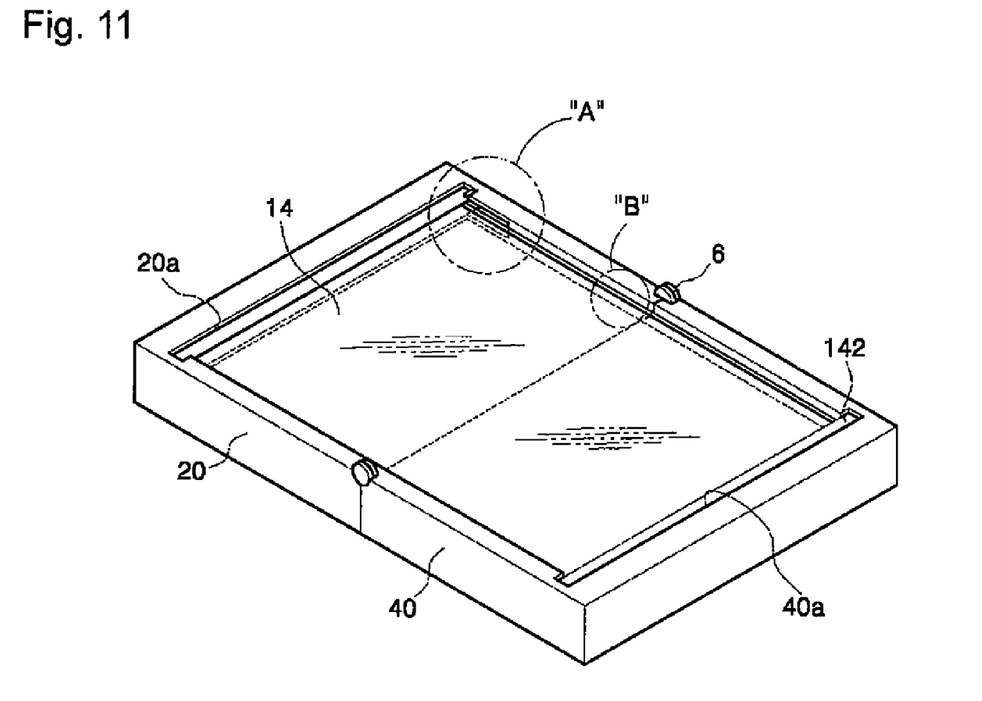
Figure 12:
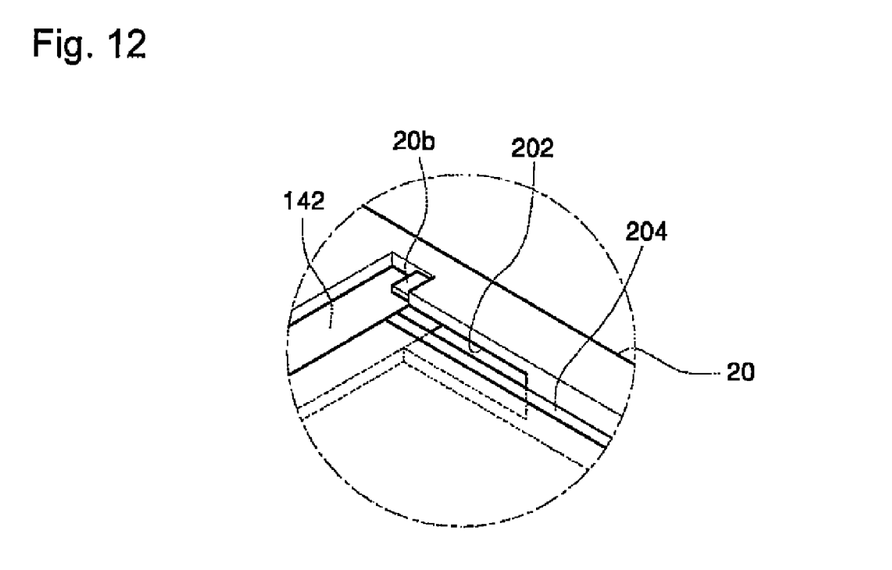
FIG. 12 is an enlarged view of a portion "A" of FIG. 11.
Figure 13:
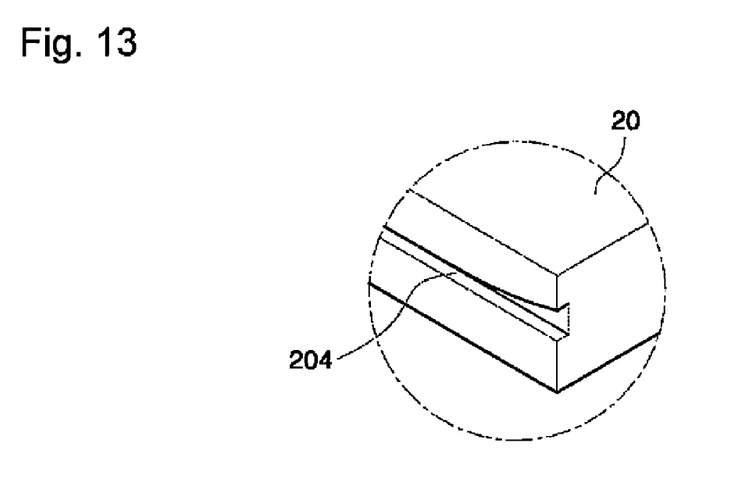
FIG. 13 is an enlarged view of a portion "B" of FIG. 11.

FIGS. 11 to 13 shows panel housings 20 and 40 that are designed to be folded.

As shown the drawings, the panel housings 20 and 40 are coupled to each other by folding supporting means 6 such that the panel housings 20 and 40 can be folded on each other. Accordingly, the optical compensating means 14 is also designed to comply with the structure of the panel housings 20 and 40 and the folding supporting means 6. That is, the fixing frame 142 of the optical compensating means 14 are coupled to the coupling grooves 20a and 40a of the panel housings 20 and 40.

Describing the coupling structure of the optical compensating means 14 with reference to FIGS. 12 and 13, the panel housing 20 is provided with a sliding groove 202 and a sub-groove 204, along which the fixing frame 142 of the optical compensating means 14 slides. The ribs 144 of the optical compensating means 14 is inserted in and coupled to the sub-groove 204. A locking member 20b for preventing the fixing frame 142 from removing from the coupling groove 20a is formed on the coupling groove 20a of the panel housing 20 (see FIG. 12).

As shown in FIG. 13, the sub-groove 204 formed on the border of the flat display elements 2 and 4 is widened in the vicinity of a middle portion of the border. If the sub-groove 204 is not widened at the middle portion, an elastic member should be used.

Figure 14:
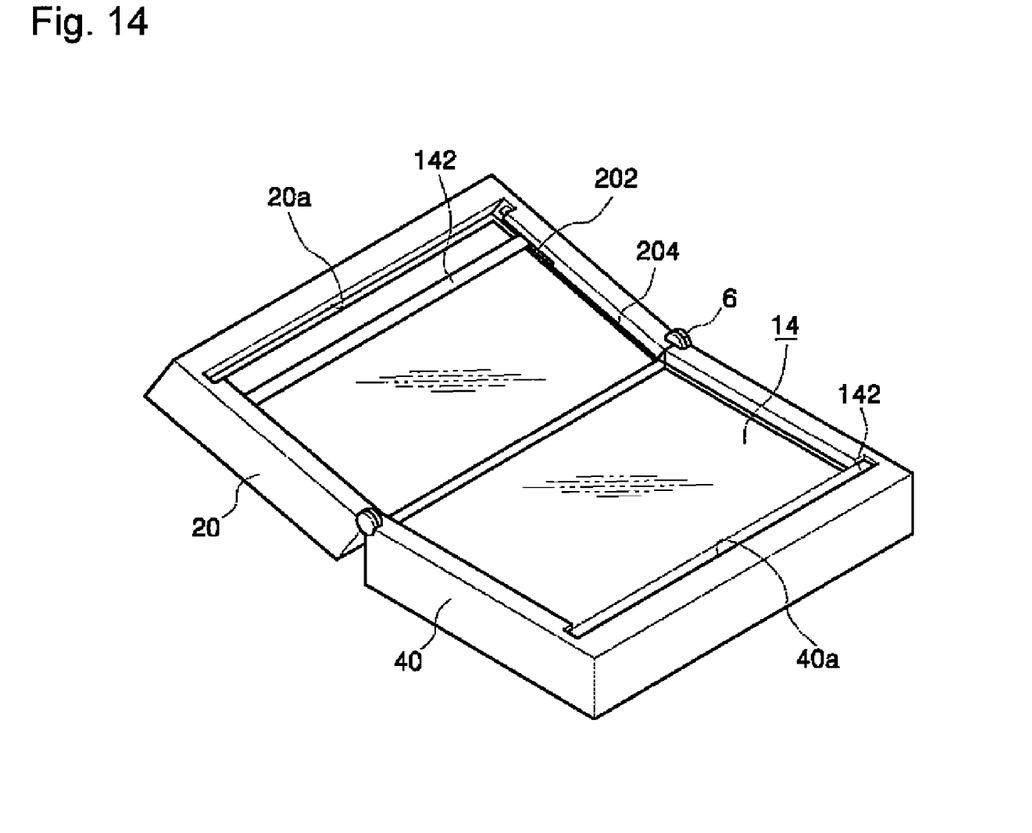
FIG. 14 is a perspective view of a multi display device of a second embodiment when it is being folded.

FIG. 14 shows a folding operation of the multi display device.

As shown in the drawing, when the folding operation is initiated, the border between the flat display elements 2 and 4 are widened. However, the integrally formed optical compensating means 14 is not widened. As a result, the fixing frame 142 of the optical compensating means 14 is moved toward the border from the coupling groove 20a along the sling groove 202.

At this point, a portion of the optical compensating means 14 which is fixed on the panel housing 20 is moved, making the sliding movement of the ribs 144 inserted into the sub-groove 204.

Figure 15:
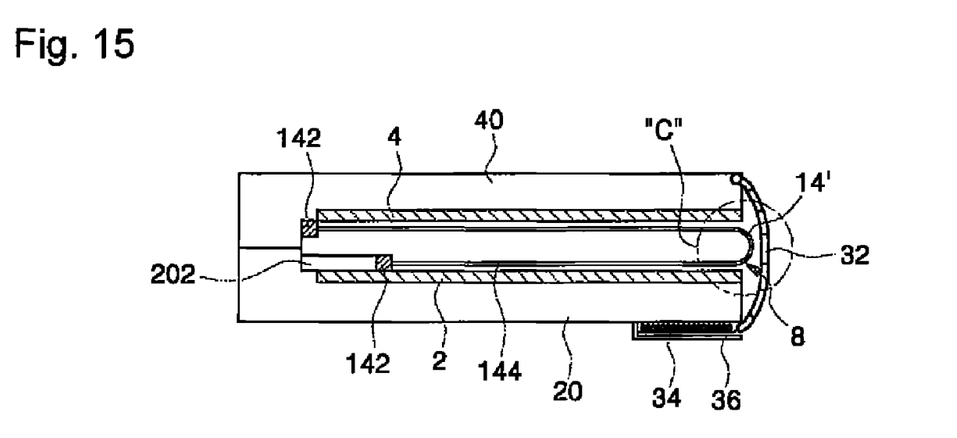
FIG. 15 is a perspective view of a multi display device of a second embodiment when it is folded.

FIG. 15 shows a folded state of the multi display device.

When the multi display device is folded, the opening 8 and the sidewalls of the flat display elements 2 and 4 are protected by the cover means 32. The cover means 32 is connected to the panel housing 20 by an elastic member 34 and received in a refuse part 36.

When the panel housing is being folded, the fixing frame 142 is moved along the sliding groove 22 of the panel housing 20 and the ribs 144 slides in the sub-groove 204. The bent portion 14' of the optical compensating means 14 is gently formed so as to prevent the film from being damaged. For the gentle formation of the bent portion 14', the sub-groove 204 of the border should be widened (see FIG. 13).

Figure 16:
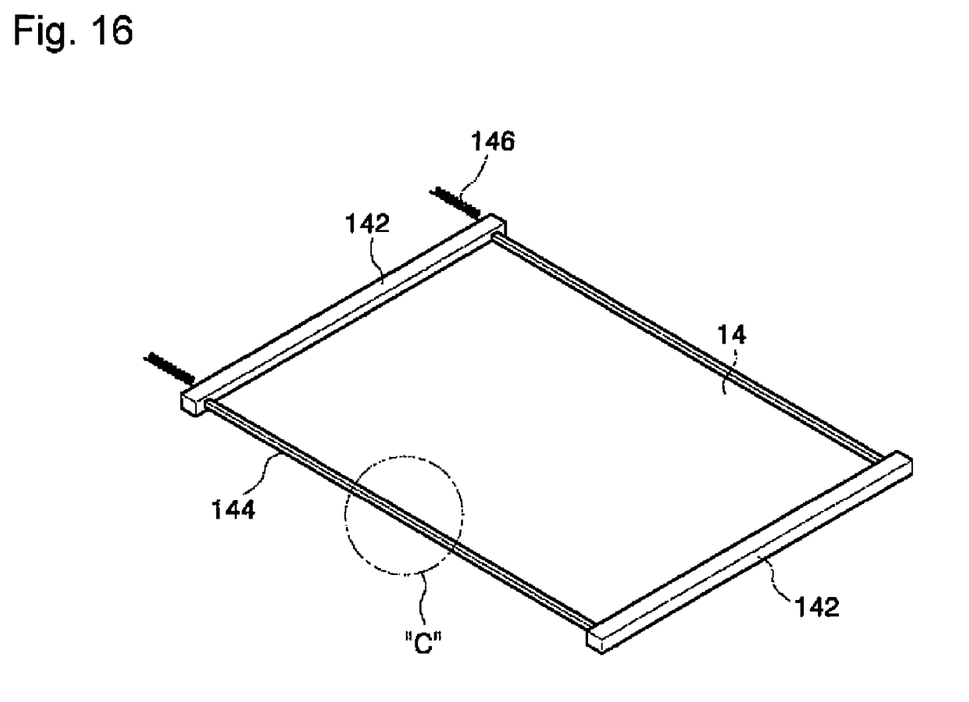
FIG. 16 is a perspective view of optical compensating means employed to a second embodiment of the present invention.

FIG. 16 shows an elastic member 146 connected to the optical compensating means. The elastic member 146 is connected between the fixing frame 142 and the panel housing 20 so as to enhance the sliding movement of the optical compensating means 14. For example, when the device is unfolded, the elastic member 146 biases the optical compensating means 14 in a direction away from the border. Accordingly, the optical compensating means 14 is spread throughout the whole surface of the panel housings 20 and 40.

Figure 17:
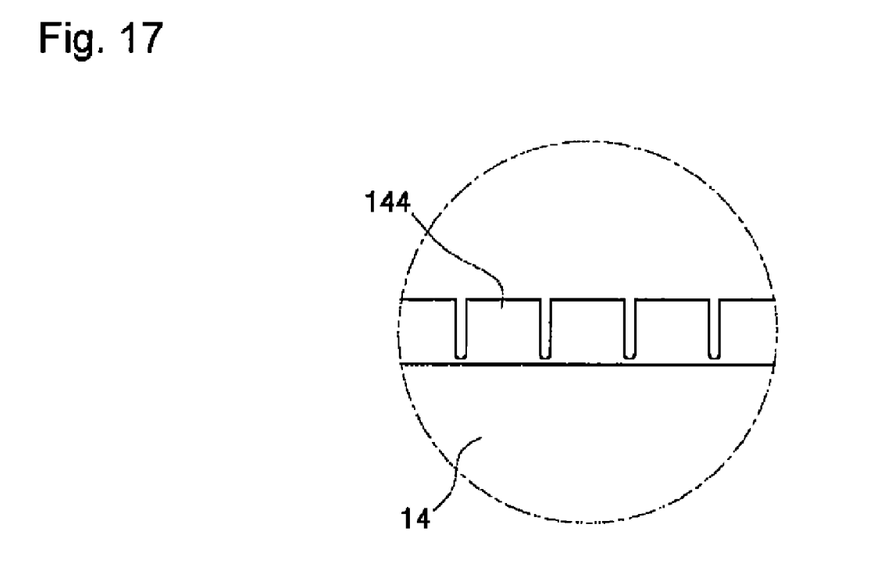
FIG. 17 is an enlarged view of a portion "C" of FIG. 16.

FIG. 17 shows the ribs 144 of the bent portion 14' of the optical compensating means 14. That is, the ribs 144 are discontinuously formed so that they can be easily bent. Preferably, the ribs 144 and the fixing frame 142 are formed of synthetic resin.

To make the optical compensating means 14 closely contacting the flat display elements 2 and 4, it is preferable that the compensating means 14 formed in a film-shape is attached on the bottom of the fixing frame 142.

Figure 18:
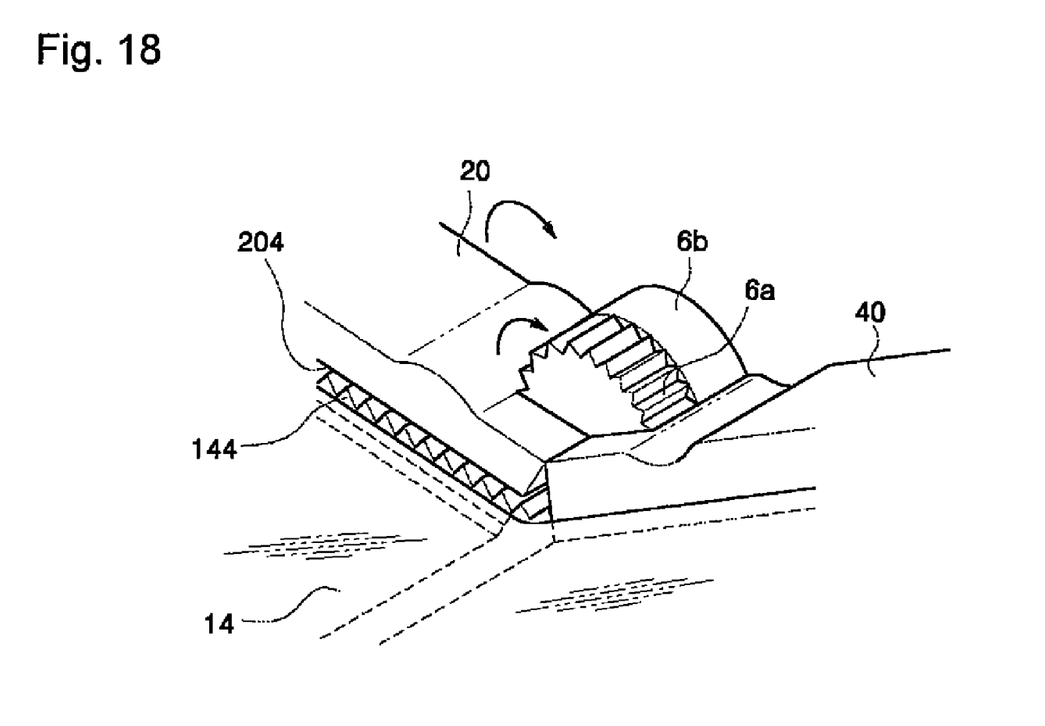
FIGS. 18 and 19 are perspective views of transmission means employed to a second embodiment of the present invention.
Figure 19:
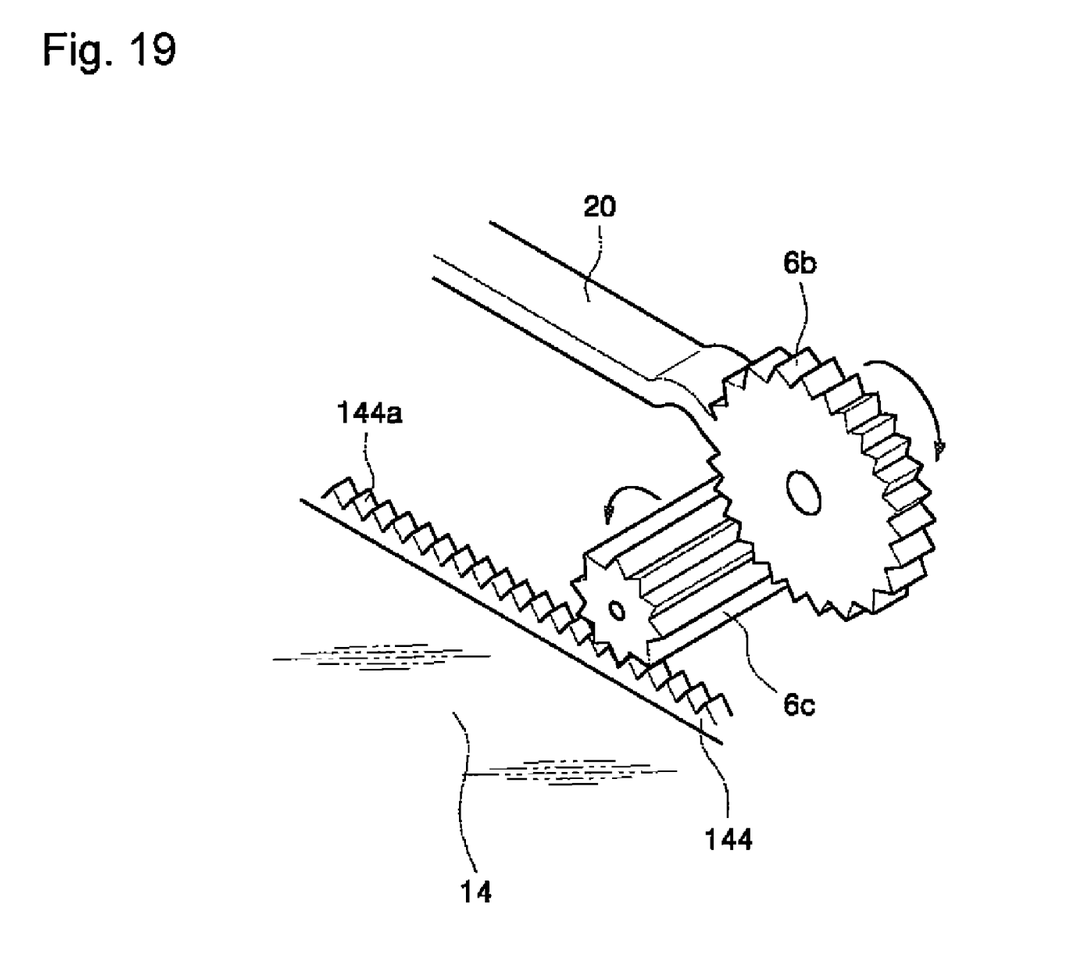

FIGS. 18 and 19 shows transmission means for the effective sliding operation for the optical compensating means 14.

As shown in the drawings, the transmission means is designed to make the panel housings 20 and 40 to slide and the sliding movement is transmitted to the optical compensating means 14 when the panel housings 20 and 40 are being folded. At this point, the movement of the hinge assembly 6 connected to the panel housings 20 and 40 is transmitted to the optical compensating means 14.

Describing more in detail, the hinge assembly 6 should be divided into two structures to make the panel housings 20 and 40 to be foldable on each other. At this point, one structure is used as a gear shaft 6b, and the other structure is used as a normal shaft 6a. The gear shaft 6b is integrally formed with the panel housing 20, and the normal shaft 6a is integrally formed with the panel housing 40.

Accordingly, when the panel housings 20 and 40 are folded, the gear shaft 6b moved in the arrow direction, and the movement of the gear shaft 6b is transmitted to the optical compensating means 14. For this end, the ribs 144 are provided with a concave portion 144a.

When the gear shaft 6b is moved in the arrow direction, a transmission gear 6c is moved in the opposite direction. Accordingly, this movement is transmitted to the ribs 144, making the fixing frame 142 of the optical compensating means 14 to move toward the border.

As described above, when the optical compensating means 14 is moved using the gear shaft 6b, the pitch of the teeth of the gear should be designed such that the distance of the flat display elements 2 and 4 when they are folded is less than thickness of the bent part 14' of the optical compensating means 14 so that the optical compensating means 14 can be gently bent when the panel housings 20 and 40 are folded, thereby preventing the optical compensating means 14 from damaged.

As another example, a band can be used as the transmission means. That is, one end of the band is connected to the hinge assembly 6 or the panel housings 20 and 40, and the other end is connected to the optical compensating means 14.

INDUSTRIAL APPLICABILITY

As described above, the multi display device can realize the multi information system having a larger sized screen by connecting plural display devices.

Particularly, by minimizing or eliminating the non-display area formed at the border between adjacent sidewalls of the display elements, the display quality can be improved.

In addition, when the display device is folded, the exposed sidewalls can be covered and protected, information display system having one enlarged screen can be realized.

The invention claimed is:

1. A multi display device comprising:
   at least two flat display elements, each display element having sidewalk which are arranged adjacent to each other to form an enlarged screen;
   panel housings for receiving and supporting the flat display elements;
   an optical compensating means for refracting light to a border between the sidewalls of the display elements, a non-display area; and
   a cover in the shape of two flat parallel sides joined at one end by a perpendicular edge for covering the edges on a surface of the flat display elements such that the flat display elements are arranged co-planar and adjacent to each other at adjacent side ends when the display elements are unfolded,
   wherein the panel housings are connected by a folding support means so that the panel housing is foldable and unfoldable, and the optical compensating means has an inclined structure parallel to the border between the adjacent flat display elements, and the angle of the refracting light is in a range of about 5-85°.

2. A multi display device of claim 1 wherein a space or a light guiding plate is defined or disposed between the optical compensating means and a location where the refracted light intersects the normal axis.

3. A multi display device of claim 1 wherein a diffuser is disposed on a location where the refracted light of the flat display elements intersects the normal axis.

4. A multi display device of claim 1 wherein when a distance from a point where the light is initially refracted to a second point where the light intersects the normal axis is B, B is equal to A/tanθ, wherein A is a length from the center of a board to the non-display area of one of the flat display elements, the length A is about 0.1-3 mm and a refraction angle θ is in a range of about 5-85°.

5. A multi display device of claim 1 wherein the optical compensating means comprises a light transmittable/refractable member having an inclined surface at a predetermined angle with respect to a screen of the flat display elements.

6. A multi display device of claim 1 wherein the optical compensating means is symmetrically formed on the flat display elements.

7. A multi display device of claim 6 wherein the optical compensating means is designed to cover a screen of the flat display elements and the adjacent sidewalls.

8. A multi display device of claim 6 further comprising a transparent protecting member for covering the screen and the adjacent sidewalls.

9. A multi display device of claim 1 wherein the panel housings are provided with openings so that the adjacent sidewalls can contact each other.

10. A multi display device of claim 1 wherein the folding support means comprises a hinge assembly installed on a rotational center of the panel housings.

11. A multi display device of claim 1 wherein the flat display elements are assembled with a driving circuit board and a back light by a chassis, wherein the chassis comprises a fixing member for preventing the panels assembly from removing and moving and a supporting member for maintaining the panel assembly at a predetermined height.

12. A multi display device of claim 1 further comprising an input means formed on the flat display elements and a keyboard.

13. A multi display device of claim 12 wherein the input means is a touch panel.

14. A multi display device of claim 1 wherein the panel housings are provided with a receiving part for receiving the optical compensating means.

15. A multi display device of claim 1 further comprising a cover means for covering the adjacent sidewalls and the optical compensating means.

16. A multi display device of claim 1 wherein the optical compensating means is symmetrical on a board between the adjacent sidewalls, and formed of a single film.

17. A multi display device of claim 16 wherein the optical compensating means comprises fixing members inserted into coupling grooves formed on the panel housings.

18. A multi display device of claim 17 wherein an elastic member is disposed between the fixing members and the panel housings.

19. A multi display device of claim 17 wherein the panel housings are provided with a sliding groove which the fixing members of the optical compensating member moves therewith.

20. A multi display device of claim 17 wherein the optical compensating means comprises ribs inserted into minute grooves formed on the panel housings.

21. A multi display device of claim 20 wherein the minute grooves are widened to accommodate the ribs.

22. A multi display device of claim 16 further comprising a transmission means for transmitting the movement of the panel housings to the optical compensating means when the panel housings are being folded or unfolded.

23. A multi display device of claim 22 wherein movement of a hinge assembly connected to the panel housings is transmitted to the optical compensating means.

24. A multi display device of claim 23 wherein the hinge assembly is formed as a gear.

* * * * *